United States Patent [19]

Dyer

[11] Patent Number: 4,972,637
[45] Date of Patent: Nov. 27, 1990

[54] ABRASIVE PRODUCTS

[76] Inventor: Henry B. Dyer, 28 George Street, Bryanston, Transvaal, South Africa

[21] Appl. No.: 255,788

[22] Filed: Oct. 11, 1988

[30] Foreign Application Priority Data

Oct. 12, 1987 [ZA] South Africa .................. 87/7645
Feb. 9, 1988 [ZA] South Africa .................. 88/0899

[51] Int. Cl.$^5$ ............................................. B23B 27/14
[52] U.S. Cl. .................................... 51/295; 76/101.9; 407/118; 51/204
[58] Field of Search ............... 51/293, 295, 204, 209, 51/206, 211 R; 407/117, 118, 119, 120; 76/101 R, 108 R

[56] References Cited

U.S. PATENT DOCUMENTS

| | | | |
|---|---|---|---|
| 4,255,165 | 3/1981 | Dennis | 51/295 |
| 4,311,490 | 1/1982 | Bovenkerk | 51/293 |
| 4,504,284 | 3/1985 | Ohno | 51/293 |
| 4,604,106 | 8/1985 | Hall | 51/293 |
| 4,629,373 | 12/1986 | Hall | 407/118 |
| 4,716,975 | 1/1988 | Dennis | 407/118 |
| 4,784,023 | 11/1989 | Dennis | 407/119 |

FOREIGN PATENT DOCUMENTS

| | | | |
|---|---|---|---|
| 0177466 | 9/1985 | European Pat. Off. | |
| 48003 | 3/1980 | Japan | 51/293 |
| 271120 | 1/1951 | Switzerland | 51/211 R |

Primary Examiner—Frederick R. Schmidt
Assistant Examiner—Blynn Shideler
Attorney, Agent, or Firm—Scully, Scott, Murphy & Presser

[57] ABSTRACT

A tool insert comprising an abrasive compact bonded to a cemented carbide support. The cutting edge of the tool is provided by the periphery of the compact. A plurality of recesses, each filled with abrasive compact material, extend into the cemented carbide support from the compact/carbide interface. The recesses are arranged in a series of rows, with each recess being staggered relative to its nearest neighbour in an adjacent row.

In use, wear of the compact cutting edge occurs and eventually wears down to the carbide/compact interface. Thereafter, the carbide between adjacent recesses wears quicker than the diamond compact material which is located in each recess creating, in effect, a plurality of cutting ridges or projections.

8 Claims, 3 Drawing Sheets

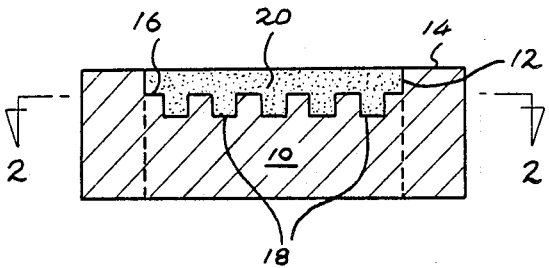
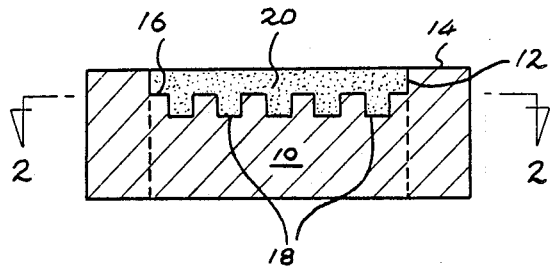
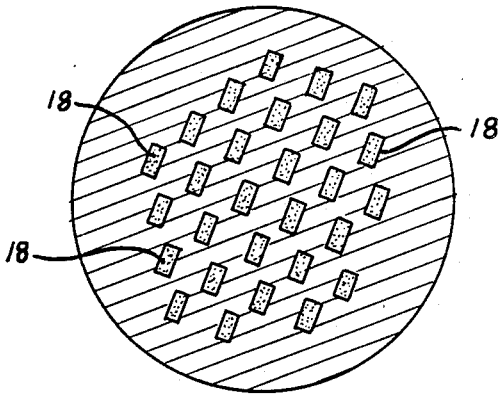
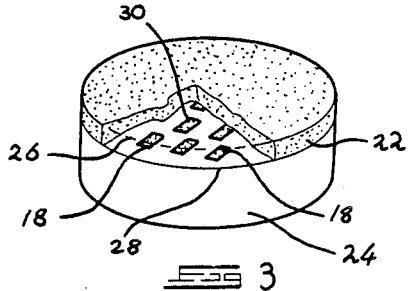
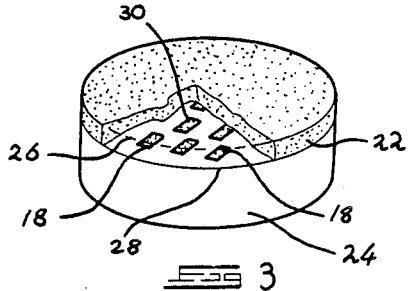

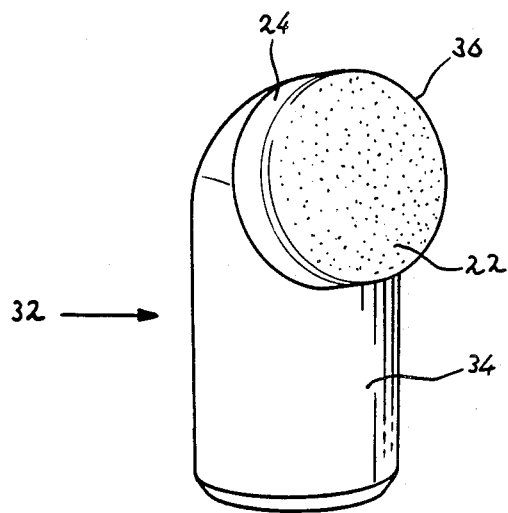
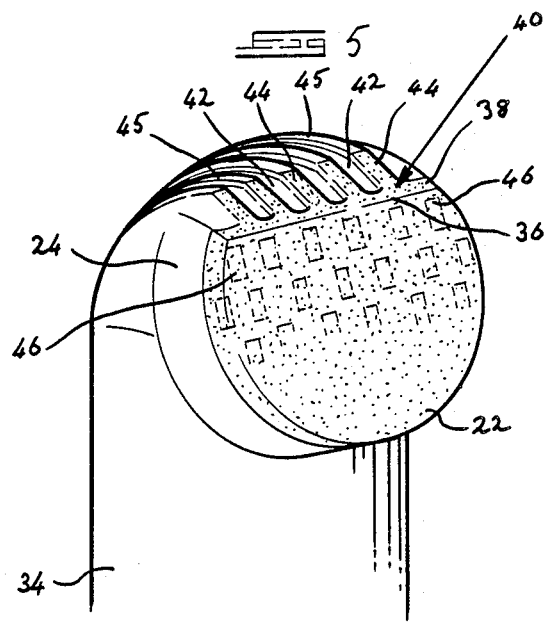

ABRASIVE PRODUCTS

BACKGROUND OF THE INVENTION

This invention relates to abrasive products.

Abrasive compacts are used extensively in cutting, milling, grinding, drilling and other abrasive operations. The abrasive compacts consist of polycrystalline diamond or cubic boron nitride particles bonded into a coherent hard conglomerate. The abrasive particle content of abrasive compacts is high and there is an extensive amount of direct particle-to-particle bonding. Abrasive compacts are made under elevated temperature and pressure conditions at which the abrasive particle, be it diamond or cubic boron nitride, is crystallographically stable.

Abrasive compacts tend to be brittle and in use they are frequently supported by being bonded to a cemented carbide substrate. Such supported abrasive compacts are known in the art as composite abrasive compacts. The composite abrasive compact may be used as such in the working surface of an abrasive tool. Alternatively, particularly in drilling and mining operation, it has been found advantageous to bond the composite abrasive compact to an elongate cemented carbide pin to produce what is known as a stud cutter. The stud cutter is then mounted in the working surface of a drill bit or a mining pick.

Recently there has been introduced to the market a composite diamond abrasive compact known as the "claw" cutter. The "claw" cutter has a diamond compact layer on the cemented carbide substrate and in addition a series of grooves formed in the substrate immediately behind the diamond compact layer and containing diamond compact material. During use wear of the compact layer occurs and once this wear reaches the grooved zone, a grooved structure of alternating thick and thin compact ridges develops enabling a longer and more effective abrasive action to take place.

U.S. Patent Specification No. 4,629,373 describes a diamond abrasive compact having enhanced surface irregularities over at least a portion of at least one of the faces to assist in bonding that surface to other materials such as metal by convention mounting techniques. The diamond abrasive compact is used as such without a carbide or metal backing.

European Patent Publication No. 0177466 describes a cutting element for a drill bit comprising a body of a hard material such as cemented carbide having strips of a diamond substance, for example diamond compact, disposed in grooves formed in a cutting face of the body.

SUMMARY OF THE INVENTION

According to the present invention, there is provided a tool insert comprising an abrasive compact having major flat surfaces on each of opposite sides thereof, at least a part of the periphery of one major surface providing a cutting edge of the insert, a cemented carbide support bonded to the other major surface, a plurality of discrete, spaced recesses extending into the cemented carbide support from the compact/carbide interface, the recesses containing abrasive compact and being arranged in a series of rows and each recess being staggered relative to its nearest neighbour in an adjacent row and containing abrasive compact material.

Further according to the invention, there is provided a method of making a tool insert as described above including the steps of providing a cemented carbide support having a major flat surface on each of opposite sides thereof, the one major flat surface having a plurality of discrete, spaced recesses formed therein, forming an unbonded assembly by depositing a layer of compact-forming material on the recessed major flat surface so that the material fills each recess and forms a layer on the surface and subjecting the unbonded assembly to elevated conditions of temperature and pressure suitable to produce an abrasive compact of the abrasive compact-forming material.

DESCRIPTION OF THE DRAWINGS

FIG. 1 illustrates a sectional side view of one embodiment of making a tool insert of the invention;

FIG. 2 illustrates a view along the line 2—2 of FIG. 1;

FIG. 3 illustrates a partially cut-away perspective view of the tool insert produced by the method;

FIG. 4 illustrates the tool insert of FIG. 3 bonded to an elongate pin to form a stud cutter;

FIG. 5 illustrates the stud cutter of FIG. 4 after it has been used in a drilling or like operation;

DETAILED DESCRIPTION OF THE INVENTION

Figure 6:
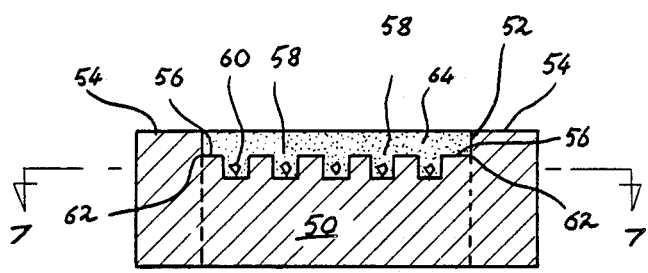
FIG. 6 illustrates a sectional side view of a second embodiment of making a tool insert of the invention.

The recesses may take any one of a variety of shapes. For example, they can be circular, square, rectangular or triangular in plan. During use, wear of the compact cutting edge occurs and once this wear reaches the compact/carbide interface the recesses, filled with compact, wear less rapidly than the cemented carbide and act, in effect, as cutting ridges or projections.

The recesses will be discrete and will preferably have a cross sectional area of the order of 1 to 8 $mm^2$. Each recess will typically be spaced from its nearest neighbor by a distance of the order of 1 to 3 mm. The recesses will extend into the cemented carbide support, but not in general extend all the way through the support. Typically, the recesses will extend into the cemented carbide support to a depth of 1 to 3 mm from the compact/carbide interface.

Each recess will contain abrasive compact material. This abrasive compact material will be integral with the layer of abrasive compact which covers the cemented carbide support. It will also be bonded to the cemented carbide support. Some or all of the recesses may contain a relatively large ultra-hard abrasive particle in addition to the compact. This ultra-hard abrasive particle will typically be diamond or cubic boron nitride and will be considerably larger than the particles which are used to make the abrasive compact. Typically, the large particles will be of the order of 0.5 mm or larger. It is preferable that the ultra-hard abrasive particle, when used, is of the same type as that used to produce the abrasive compact.

Compact forming material as used herein means material capable of producing an abrasive compact when subjected to compact forming conditions of temperature and pressure. In the case of diamond that material may be diamond particles alone or in admixture with a suitable second phase. The second phase, when used, will invariably consist of or contain diamond catalyst. Similarly in the case of cubic boron nitride abrasive compacts, the material will be cubic boron nitride particles alone or in admixture of a suitable second phase. The second phase may consist of or contain a cubic boron nitride catalyst. Abrasive compacts and materials which are used to make them are well known and have been described extensively in the patent literature.

The cemented carbide support may be in the form of a disc. Alternatively, the cemented carbide support may be a disc into one major flat surface of which is formed a major recess or cavity. The discrete, spaced recesses will be formed in the base surface of the cavity.

The cemented carbide may be any known in the art but is preferably cemented tungsten carbide.

The elevated conditions of temperature and pressure necessary to produce abrasive compact of the abrasive compact forming material are well known in the art. Typically, these conditions involve applying a pressure in the range 50–70 kilobars and simultaneously a temperature in the range 1450°–1600° C. for a period of 10–30 minutes.

Embodies of the invention will now be described with reference to the accompanying drawings. FIGS. 1 to 3 illustrate a first embodiment. Referring to these Figures, there is shown a body 10 of cemented carbide which has a circular, in plan, cavity 12 formed in one major flat surface 14. The base surface 16 of the cavity has a plurality of small spaced recesses 18 formed therein. The recesses, as illustrated by FIG. 2, are discrete and rectangular in plan and cover the entire base surface 16.

Placed on top of the base surface 16 is a mass 20 of fine diamond particles, i.e. up to 100 microns in size. These fine diamond particles fill each recess 18 as well as the cavity 12.

The loaded disc 10 is placed in a capsule which is placed in the reaction zone of a conventional high temperature/high pressure apparatus. The contents of the capsule are subjected to a pressure of 55 kilobars and simultaneously a temperature of 1500° C. and these elevated conditions are maintained for a period of 15 minutes. This resulted in the diamond layer 20 forming a diamond compact which was bonded to the carbide base 10. Each recess 18 was also filled with diamond compact which was integral with the layer 20 and bonded to the carbide body 10.

The product was removed from the reaction capsule and the sides of the disc removed, as illustrated by dotted lines in FIG. 1. After removal of the sides, the resulting product was a tool insert as illustrated by FIG. 3. The tool insert consisted of a diamond abrasive compact layer 22 bonded to a cemented carbide support 24. The periphery 26 of the compact layer 22 provides the cutting edge for the insert. It will be noted by this Figure and FIG. 2 that the recesses 18 are arranged in rows, with each recess being staggered relative to its nearest neighbor in an adjacent row. Each recess extends into the carbide support 24 from the carbide/compact interface 28. Each recess is filled with diamond compact material 30 which is integral with the compact layer 22 and bonded to the carbide support 24.

The tool insert of FIG. 3 will typically be bonded to a cemented carbide pin to form a stud cutter 32. Such a stud cutter and its wear pattern in use is illustrated by FIGS. 4 and 5. Referring to these Figures, it will be seen that the tool insert of FIG. 3 comprising the diamond abrasive compact layer 22 bonded to the cemented carbide support 24 is bonded through the carbide support 24 to an elongate cemented carbide pin 34. The top edge 36 of the compact layer 22 provides the cutting edge for the stud cutter.

In use, the stud cutter will be mounted in a drill bit in known manner so that the cutting edge 36 is exposed and available to contact the surface to be drilled. Wear of the cutting edge occurs under the severe conditions encountered in drilling so that a wear plane 38, as illustrated in somewhat exaggerated manner by FIG. 5, develops. It will be noted that the wear plane 38 extends across the compact layer 22 and across a portion 40 of the carbide support 24. As wear takes place so that compact material in the recesses 18 is exposed. This compact material wears much slower than the carbide in the regions 42 with a result that a depression of shallow cavity develops in the region between adjacent compact material regions 44. These regions 44 together with carbide immediately behind them form, in effect, extended cutting ridges or projections 45 which enhance the cutting action. As wear continues further the cutting edge 36 (now essentially planar) and the plane 38 move downwards exposing the next row of compact material regions 46 (shown in dotted lines). These regions 46 are discrete and staggered relative to the just-consumed compact regions 44 and so any chips, cracks, spalls in those regions 44 will not propagate continuously in the worn state. Moreover, the regions 46 act in different planes to the just-consumed regions 44 which further enhances the cutting action.

Figure 7:
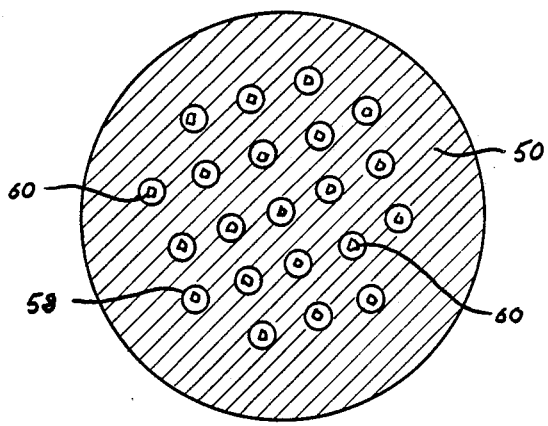
FIG. 7 illustrates a view along the line 7—7 of FIG. 6.
Figure 8:
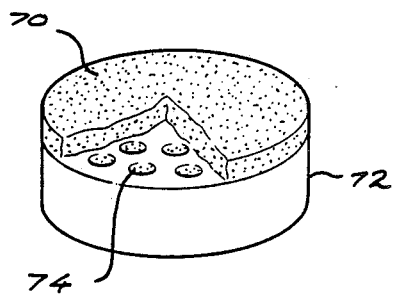
FIG. 8 illustrates a perspective view of the tool insert produced by the method of FIGS. 6 and 7.

A second embodiment of the invention will now be described with reference to FIGS. 6 to 8. A body 50 of cemented carbide has a circular, in plan, cavity 52 formed in one major flat surface 54. The base surface 56 of the cavity has a plurality of small spaced recesses 58 formed therein. Into each of these recesses is placed a relatively large diamond particle 60. The recesses 58 are all located inside of the periphery 62 of the base surface 56 and cover it entirely. The size of each recess 58 is such as to accommodate the diamond particle 60 located therein with a fairly loose fit.

Placed on top of the base surface 56 is a layer 64 of fine diamond particles, i.e. of the order of 50 to 100 microns in size. Some of these fine diamond particles fall into the recesses 58 and surround the larger diamond particles located therein.

The loaded disc 50 is placed in a capsule which is placed in the reaction zone of a conventional high temperature/high pressure apparatus. The contents of the capsule are subjected to a pressure of 55 kilobars and simultaneously a temperature of 1500° C. and these elevated conditions are maintained for a period of 15 minutes. This resulted in the diamond layer 64 forming a diamond compact which was bonded to the carbide body. Each recess 58 contained the large diamond particles surrounded by diamond compact. The diamond compact in the recesses was integral with the layer 64 and bonded to the large diamond particles and to the carbide body.

The product was removed from the reaction capsule and the sides of the disc removed, as illustrated by a dotted lines in FIG. 1. After removal of the sides, the resulting product was a tool insert as illustrated by FIG. 8. It will be noted from this Figure and FIG. 7 that the tool insert comprises a diamond compact layer 70 bonded to a cemented carbide support 72. The recesses 74 each contain a large diamond particle and diamond compact material. The recesses are arranged in rows with each recess being staggered relative to its nearest neighbor in an adjacent row. The tool insert will be used in the same manner as that described above with reference to FIGS. 4 and 5.

The tool inserts of the invention have further advantages over a tool insert of the 'claw' cutter type described above. The staggered arrangement of recesses allows for improved bonding of the abrasive compact to the substrate and more symmetrical heat distribution during brazing of the composite compact to an elongate pin. The insert is more shock resistant and any deformation during manufacture will be more uniform resulting in the insert containing less asymmetric stress. The recesses are contained within the bulk of the product and are not continuous to the periphery so that manufacture is easier.

I claim:

1. A tool insert comprising an abrasive compact having major surfaces on each of opposite sides thereof, at least a first major surface forming a major flat surface, at least a part of the periphery of the first major flat surface providing a cutting edge for the insert, a cemented carbide support bonded to the other major surface forming a compact/carbide interface, a plurality of discrete, spaced projections extending from said other major surface into recesses or cavities in the cemented carbide support through the compact/carbide interface, the recesses being arranged in alternating rows and each recess being staggered relative to its nearest neighbor in an adjacent row, and each recess containing abrasive compact material projecting from said other major surface.

2. A tool insert according to claim 1, wherein at least some of the recesses also contain an ultra-hard abrasive particle having a size greater than particles forming said abrasive compact material.

3. A tool insert according to claim 2, wherein the ultra-hard abrasive particle has a size of at least 0.5 mm.

4. A tool insert according to claim 2, wherein the ultra-hard abrasive particle comprises the same material which is used to make the abrasive compact.

5. A tool insert according to claim 1 wherein the abrasive compact is a diamond abrasive compact.

6. A tool insert according to claim 1 wherein the recesses are positioned interiorly from the periphery of said abrasive compact.

7. A method of making a tool insert as claimed in claim 1 including the steps of: providing a cemented carbide support having a major flat surface on each of opposite sides thereof, a first major flat surface having a plurality of discrete, spaced recesses formed therein; forming an unbonded assembly by depositing a layer of compact-forming material on the first major flat surface having said recesses to that the material fills each recess and forms a layer on the first major flat surface; and subjecting the unbonded assembly to elevated conditions of temperature and pressure suitable to produce an abrasive compact of the abrasive compact-forming material, such that said compact is integral with the material which fills each recess.

8. A method according to claim 7, wherein the conditions used for producing the abrasive compact are a pressure in the range 50 to 70 kilobars, a temperature in the range of 1450° to 1600° C. and these elevated conditions are maintained for a period of 10 to 30 minutes.

* * * * *